United States Patent
Jankel et al.

(10) Patent No.: US 11,472,307 B2
(45) Date of Patent: Oct. 18, 2022

(54) DISPATCHABLE RENEWABLE POWER SUPPLY

(71) Applicant: AQUANOVIS HOLDINGS LIMITED, London (GB)

(72) Inventors: Paul Jankel, London (GB); Hayden Postle-Floyd, London (GB); Daniel Taylor, London (GB)

(73) Assignee: AQUANOVIS HOLDINGS LIMITED, London (GB)

( * ) Notice: Subject to any disclaimer, the term of this patent is extended or adjusted under 35 U.S.C. 154(b) by 0 days.

(21) Appl. No.: 17/280,073

(22) PCT Filed: Sep. 25, 2019

(86) PCT No.: PCT/GB2019/052704
§ 371 (c)(1),
(2) Date: Mar. 25, 2021

(87) PCT Pub. No.: WO2020/065310
PCT Pub. Date: Apr. 2, 2020

(65) Prior Publication Data
US 2021/0339646 A1    Nov. 4, 2021

(30) Foreign Application Priority Data

Sep. 26, 2018 (GB) .................. 1815677
Oct. 11, 2018 (GB) .................. 1816604
Aug. 8, 2019 (GB) .................. 1911377

(51) Int. Cl.
*B60L 53/00* (2019.01)
*B60L 53/57* (2019.01)
(Continued)

(52) U.S. Cl.
CPC ............. *B60L 53/57* (2019.02); *B60L 53/51* (2019.02); *B60L 53/52* (2019.02); *B60L 53/53* (2019.02); *B60L 53/63* (2019.02); *H02J 2300/20* (2020.01)

(58) Field of Classification Search
CPC .......... B60L 53/57; B60L 53/51; B60L 53/52; B60L 53/63; H02J 2300/20;
(Continued)

(56) References Cited

U.S. PATENT DOCUMENTS 7,291,936 B1 * 11/2007 Robson ................. F03B 17/061
290/43
8,093,861 B2 * 1/2012 Christensen ........... B60L 53/305
320/109
(Continued)

FOREIGN PATENT DOCUMENTS

CA    2865101 A1 *  9/2013  ............ H02J 3/382
CN    108141037 A  *  6/2018  ............ H02M 3/04
(Continued)

OTHER PUBLICATIONS

International Search Report and Written Opinion issued in counterpart PCT Application No. PCT/GB2019/052704 dated Jan. 17, 2020 (ten (10) pages).

*Primary Examiner* — Naum Levin
(74) *Attorney, Agent, or Firm* — David S. Bradin; Nexsen Pruet, PLLC

(57) ABSTRACT

A dispatchable power supply is disclosed, more particularly an off-grid power supply, more particularly an off-grid electric vehicle charge station, more particularly to an off-grid renewable energy powered electric vehicle charge station.

18 Claims, 6 Drawing Sheets

(51) Int. Cl.
   *B60L 53/51* (2019.01)
   *B60L 53/53* (2019.01)
   *B60L 53/52* (2019.01)
   *B60L 53/63* (2019.01)

(58) Field of Classification Search
   CPC ...... H02J 2300/40; H02J 2310/48; H02J 7/35; H02J 7/34; Y02T 90/12
   See application file for complete search history.

(56) References Cited

U.S. PATENT DOCUMENTS

| | | | | |
|---|---|---|---|---|
| 9,026,259 | B2 * | 5/2015 | Zadeh | H02J 3/382 |
| | | | | 700/291 |
| 9,660,451 | B1 * | 5/2017 | Naiknaware | H02J 3/38 |
| 10,423,185 | B2 * | 9/2019 | Baone | H02J 3/06 |
| 11,056,906 | B2 * | 7/2021 | Chang | H02J 3/381 |
| 11,114,855 | B2 * | 9/2021 | Handelsman | H02J 7/0068 |
| 11,128,141 | B2 * | 9/2021 | Marchegiani | H02J 3/382 |
| 2007/0100503 | A1 | 5/2007 | Balan et al. | |
| 2007/0282495 | A1 * | 12/2007 | Kempton | B60L 55/00 |
| | | | | 701/22 |
| 2008/0216822 | A1 * | 9/2008 | Lazzara | F03G 6/067 |
| | | | | 126/617 |
| 2012/0067551 | A1 * | 3/2012 | Ganapathi | C09K 5/04 |
| | | | | 165/104.21 |
| 2012/0249065 | A1 | 10/2012 | Bissonette et al. | |
| 2013/0002032 | A1 | 1/2013 | Mori et al. | |
| 2013/0190938 | A1 | 7/2013 | Zadeh | |
| 2014/0200723 | A1 | 7/2014 | Roy et al. | |
| 2015/0063473 | A1 * | 3/2015 | Nishibayashi | H04B 3/542 |
| | | | | 375/257 |
| 2016/0207410 | A1 * | 7/2016 | Nazarian | H02J 7/00 |
| 2018/0287388 | A1 * | 10/2018 | Bates | H02J 3/381 |
| 2019/0081506 | A1 * | 3/2019 | Chang | H02J 3/381 |
| 2019/0263658 | A1 * | 8/2019 | Janajreh | B01J 6/008 |
| 2020/0254888 | A1 * | 8/2020 | Weiss | B60L 53/53 |

FOREIGN PATENT DOCUMENTS

| | | | | |
|---|---|---|---|---|
| CN | 106233567 B | * | 2/2019 | ............. H02J 3/466 |
| CN | 110998484 A | * | 4/2020 | ............. H02J 3/381 |
| EP | 3203596 A1 | * | 8/2017 | ............. H02J 3/04 |
| KR | 101915075 B1 | * | 11/2018 | ............. B60L 53/60 |

* cited by examiner

DISPATCHABLE RENEWABLE POWER SUPPLY

CROSS REFERENCE TO RELATED APPLICATIONS

This application is a 35 U.S.C. § 371 U.S. national phase entry of International Application No. PCT/GB2019/052704 filed Sep. 25, 2019, which is related to and claims priority to foreign GB Application No. 1815677.8 filed on Sep. 26, 2018, and foreign GB Application No. 1816604.1 filed on Oct. 11, 2018, and foreign GB Application No. 1911377.8 filed on Aug. 8, 2019; the entire disclosures of which are incorporated herein by reference.

SCOPE OF THE INVENTION

The present invention is concerned with a dispatchable power supply, for example a dispatchable off-grid power supply, for example an off-grid electric vehicle charge station, for example an off-grid renewable energy powered electric vehicle charge station.

The present invention turns multiple sources of non-dispatchable generation into a dispatchable power source.

Dispatchable power is, by definition, predictable in terms of the instantaneous power it can deliver, and is 100% reliable when loaded with demand, up to 100% of its maximum design power output.

BACKGROUND OF THE INVENTION

Electric vehicle (EV) technology is becoming more and more common in many countries around the world as part of a continuing effort to reduce global emissions which are harmful to the environment. Indeed, many countries are introducing policies and statutes relating to harmful emissions, in particular, limiting the sale or even prohibiting the sale of vehicles having internal combustion engines in order to achieve the targets relating to reducing polluting emissions.

EV range is limited by battery technology—currently the maximum distance between charges is approximately half of the distance travelable by an equivalent vehicle powered by an internal combustion engine (ICE). Despite this, in many areas there are still not enough charge points along routes to justify the user purchasing an EV over the traditional ICE vehicle. Currently, in order to make EVs as convenient as traditional ICE vehicles there would need to be at least double the amount of charge points along routes as refuelling stations. For example, where there are long roads between built up areas, e.g. in America or Australia, charge points simply do not exist yet. This is partially as a result of EV charging grid infrastructure development lagging behind EV development. This is also partially due to lack of electric grid, or national grid, infrastructure in these areas as they are typically underdeveloped and/or consist of difficult terrain (mountainous areas, woodland, etc.).

Throughout the world, the majority of land surface area has no connection to a national grid, i.e. it is "off-grid". Therefore, the majority of global and national road networks in those areas are also "off-grid". Because of this, there are little or no EV charge points along these roads, making them inaccessible to EV users, and making EVs themselves less attractive for users than traditional ICE vehicles. There is, therefore, a desire for the presence of EV charge points in these areas.

Where road networks exist in connected areas, public-use EV charge points (for example, commercial EV charge points, particularly multiple simultaneous and continuous service EV charge points) use electricity directly from the national grid. This is because of both the lack of alternative infrastructure and the increasing demand, meaning that EV charge points are being built and connected straight to the national grid. In some cases, the electricity from such charge points may have been generated entirely through renewable energy sources such as solar, wind, hydro, etc. These may be referred to as 'green tariff' charge points. However, they still require a grid connection in order to obtain their power from the distributed renewable energy sources.

More generally, there is a need for dispatchable off-grid power from renewable energy sources, for example for providing dispatchable power to domestic, business or industrial consumers at off-grid locations.

There is also a general need for dispatchable power (including dispatchable on-grid power) from renewable energy sources.

Nomenclature and Definitions

As used herein, configurations of electricity grid (or lack thereof) are:

| Name | Definition |
|---|---|
| national grid | The network of high-voltage power lines between major power stations, connected to lower voltage lines into power distribution sub-networks, and in turn to electricity users. |
| micro-grid | A small network of electricity users with a local source of energy supply that is usually attached to a centralized national grid but can function independently. |
| micro-grid-island | Is when a micro-grid exists without any electricity connection with the national grid whatsoever. |
| off-grid | A physical location which has no connection to any electricity network whatsoever. |
| on-grid | A physical location which has connection to an electricity network (such as a national grid, micro-grid or a micro-grid island) |
| no-grid | A single electrical device which both generates, balances and discharges dispatchable electricity load with no network connections of any kind (e.g. as disclosed herein). |

As used herein, measures of electrical power, which is typically measured in watts (W), kilowatts (kW), Megawatts (MW) and Gigawatts (GW) are:

| Nomenclature | Type | Description and Source |
|---|---|---|
| $P_D$ | Fixed | Dispatchable power, "always on" |
| $P_{B-Installed}$ | Fixed | Installed capacity of a base power generator |
| $P_{B-Oversize}$ | Fixed | Design oversize: $P_{B-Installed}$ minus $P_D$ |
| $P_B$ | Instantaneous variable with time | The instantaneous power output of a base power generator |
| $P_{B-Peak}$ | Instantaneous | Maximum instantaneous power output of a base power generator |
| $P_{B-Average}$ | Fixed Average | The annual average power output of a base power generator |
| $P_{B-Low}$ | Instantaneous | Minimum instantaneous power output of a base power generator |

-continued

| Nomenclature | Type | Description and Source |
|---|---|---|
| $P_{M\text{-}Average}$ | Fixed Average | The annual average missing power: (when $P_D > P_{B\text{-}Average}$) = $P_D$ minus $P_{B\text{-}Average}$ |
| $P_{M\text{-}Peak}$ | Fixed Instantaneous | Peak missing energy at ($P_{B\text{-}Low}$): The instantaneous maximum peak is $P_D$ minus $P_B$ |
| $P_{S\text{-}Required}$ | Fixed Instantaneous | The peak required solar power from the secondary power generator |
| $P_{W\text{-}Required}$ | Fixed Instantaneous | The peak required wind power from the secondary power generator |
| $P_{Secondary\text{-}Peak}$ | Fixed Instantaneous | Maximum instantaneous power output of a secondary power generator |
| $P_{Secondary\text{-}Installed}$ | Fixed | Installed capacity of a secondary power generator |
| $P_{S\text{-}Installed}$ | Fixed | Installed capacity of solar |
| $P_{W\text{-}Installed}$ | Fixed | Installed capacity of wind |
| $P_{D\text{-}Downtime}$ | Fixed | Additional dispatchable power from load downtime |
| $P_{D\text{-}Lifted}$ | Fixed | The total lifted dispatchable power with downtime |

The Capacity factor (CO can be defined as the actual energy generated as a proportion of the total energy that could have been generated if operated at full power for the same length of time. There are several physical parameters that effect capacity factor; for example, the type of energy source, the time-period over which capacity factor is averaged (if not instantaneous), and the physical geography of any site at which the renewable energy source is to be located. Measures of capacity factor include:

| Nomenclature | Type | Description and Source |
|---|---|---|
| CF | generic | Any capacity factor |
| $CF_B$ | Annualised average | Capacity factor of a base power generator Derived from hydrological analysis from $P_{B\text{-}Installed}$ |
| $CF_{Secondary}$ | Periodic average | Capacity factor of a secondary power generator Only those times where $P_B < P_D$ |
| $CF_S$ | Periodic Average | Capacity Factors of Solar Only those times where $P_B < P_D$ |
| $CF_W$ | Periodic Average | Capacity Factors of Wind Only those times where $P_B < P_D$ |
| $CF_{Secondary\text{-}Peak}$ | Instantaneous | Peak capacity factor from a secondary power generator |
| $CF_{S\text{-}Peak}$ | Instantaneous | Peak capacity factor for a solar component of a secondary power generator |
| $CF_{W\text{-}Peak}$ | Instantaneous | Peak capacity factor for a wind component of a secondary power generator |

In this invention Power Rating (PR) refers to the maximum instantaneous power allowed to flow through a system, more particularly in or out of an energy-storage device (e.g. a battery). Measured in W, kW, MW, GW. Measures of power rating include:

| Nomenclature | Description and Source |
|---|---|
| PR | A Power Rating |
| $PR_B$ | The PR required for the base power generator output. |
| $PR_S$ | The PR required for the solar generator output. |
| $PR_W$ | The PR required for the Wind generator output. |
| $PR_{Secondary}$ | The total PR required for the Secondary power generator output. |
| $PR_{Installed}$ | The PR which is installed. |

Energy-storage (ES) is measured in units of kilowatt-hours (kWh), megawatt-hours (MWh), gigawatt-hours (GWh). Measures of energy storage include:

| Nomenclature | Description and Source |
|---|---|
| $ES_B$ | Energy storage required by base power generator |
| $ES_S$ | Energy storage required by the solar generator |
| $ES_W$ | Energy storage required by the wind generator |
| $ES_{Secondary}$ | Energy storage required by the secondary power generator |
| $ES_{Generators}$ | Total Energy storage required by one or all of the generator(s) |
| $ES_{Downtime}$ | Additional Energy storage to charge during operational downtime (zero load) |
| $ES_{Installed}$ | Total installed energy storage accounting for operational downtime |

Generation Sources

A higher annual capacity factor delivers more efficient (and therefore cost-effective) power generation, because it is generating for more of the time. The tables below show the average annualised capacity factor for onshore wind, solar and conventional hydro power generators for the year of 2017 in the USA and the UK.

TABLE 1

USA Capacity Factors (CF):

| Energy Source | Average annual CF (2017) |
|---|---|
| Wind (onshore) | 36.7% |
| Solar | 27.0% |
| Conventional Hydro | 45.2% |

Data obtained from the U.S. Energy Information Administration (www.eia.gov/electricity/monthly/epm_table_grapher.php?t=epmt_6_07_b; perma.cc/Y8MK-N9LQ).

TABLE 2

UK Capacity Factors (CF):

| Energy Source | Average Annual CF (2017) |
|---|---|
| Wind (onshore) | 28.0% |
| Solar | 10.7% |
| Conventional Hydro | 36.5% |

Data obtained from assets.publishing.service.gov.uk/government/uploads/system/uploads/attachment_data/file/736153/Ch6.pdf (perma.cc/GWY8-GCGY)

Wind

The capacity factor of wind turbines (onshore) decreases with the density of windmills, or wind turbines per square kilometre. Thus, wind farms require a lot of space, typically more than 10 hectares per MW (on land). It is generally accepted that wind power generators have a capacity factor of around 40%. Referring to FIG. 1 of the drawings, there is shown an exemplary generation profile for the same wind farm over two 4-day periods one year apart (9 to 12 Oct. 2014 and 10 to 13 Oct. 2013). It can be seen that the power generated varies significantly over this time-period and there is very little or weak correlation between the wind generations compared over the two years. Due to variations in wind speed, wind generation can vary rapidly and unpredictably between 0% and 75% instantaneous capacity factor at any time.

There is also a reduction in the power generation when the wind turbine spins over a set speed. An exemplary turbine power versus wind speed graph is illustrated in FIG. 2 of the drawings. Below a certain wind speed (the "cut-in" speed) the turbine generates too little energy to be useful. At approximately 11 metres per second (m/s) the power generation peaks at 1,000 Watts (1 kW). After this the turbine will not generate any more electricity with an increase of the wind speed. At 14 m/s the wind turbine is shut down so as to prevent damage to the device. It will be appreciated by those skilled in the art that design of the turbines themselves may contribute to improving the capacity factor of a wind turbine, however the impact of design on the capacity factor is insignificant compared to the variability of wind speed and the power generation curve illustrated in FIG. 2.

Another problem with wind is that wind speeds can drop below the "cut-in" speed for days at a time, and this can happen at any time. This is a fatal flaw in any attempt to use wind to deliver dispatchable power. The current art of wind technology cannot deliver dispatchable power on its own.

Solar

Solar is more predictable than wind, but still has a low capacity factor. Referring additionally to FIG. 3 of the drawings, pronounced seasonal variations of generation occur with solar. As can be seen from the data, which illustrates the solar radiation in California between January 2013 and May 2014, three to four times more electricity is generated in summer than in winter. This differential between summer and winter solar generation is repeated at all sites and increases with Latitude from the Equator.

To calculate the required installed capacity to deliver 1 MW of dispatchable solar energy throughout the year (accounting for nights and seasonal changes in solar strength etc.) (as demonstrated in FIG. 3), the capacity factor must be taken into account. For example, for a capacity factor of 5%, on the darkest day of the year, it would be necessary to install 20 MW of solar panels to deliver 1 MW dispatchable power all year round. This causes a converse problem; during the summer, a 20 MW solar system will peak at 10 MW instantaneous power. This is an order of magnitude larger than the desired 1 MW dispatchable power requirement. That additional energy needs to be consumed. In an "off-grid", "micro-grid-island" or "no-grid" device that excess energy cannot be transmitted to the grid.

Furthermore, although it needs less space than wind, solar energy requires approximately one hectare per 1 MW of installed power.

Setting aside commercial considerations, placement of such a large scale solar or wind installation system in environmentally sensitive areas would be undesirable, counter to the cause of preserving the environment, and is likely to be denied a construction license in any case.

Hydro

Conventional hydro-electric generated power comes in several forms.

(a) Hydro-electric dams: Water is held back for release in a high-level reservoir usually employing a dam, therefore storing gravitational potential kinetic energy. A valve or release is then opened in order to allow water to flow from the higher level to a lower level through a turbine. The turbine is connected to a generator, thus generating electric power. Typically, hydro-electric power generators with reservoirs are used for "on-demand" energy (e.g. times of instantaneous peak energy load demand). As is known in the prior art, hydro-electricity has the fastest response time of any generation source. Hydro-electric dams are also employed to assist balancing the flow of electricity within the national grid and its distribution networks. More electricity is generated than can be consumed on site. Conventional hydro-electric sites are specifically designed to generate energy (surplus to local user requirements) to be transmitted to the national grid for distribution and sale. Hydro-electric generators of this form have significant periods of generating down-time while the reservoir recharges from natural water flow into it.

(b) Pumped-Storage: In pumped-storage hydro, excess grid energy is employed to pump water from a lower-level into a higher-level reservoir. This form of conventional hydro-electricity is a kinetic-energy-storage device. Pumped storage hydro also requires a grid connection. Pumped-storage also requires down time to pump water up to the higher reservoir. Pumped-storage suffers from the double loss from both pumping water up and then generating from it being released through a turbine to generate. The current art has a consensus of 20% to 25% energy losses. So, for example, 1 MW of energy used to pump water up to the higher level would generate around 750 kW when it is released to generate.

(c) Run-of-river: This conventional form of hydro-electricity is generated without a reservoir or dam from natural flowing water; a low weir may be used to control water flow into the system. Commercial forms of run-of-river are generally designed to maximise annual energy generation; this energy is sold to the national grid.

(d) Marine-Hydro: this is a new form of hydro-electricity. Although it is still in its development phase it does not yet show the potential to offer high capacity factors. This is because it relies on tidal flow or wave movement, which are sinusoidal and intermittent respectively. The current art in Marine-hydro is also being developed as a national grid energy solution and as such requires a grid-connection.

The capacity factor for hydro in Tables 1 and 2 (above) are derived from conventional hydro-electric types. The common feature shared by all the forms of conventional hydro is that although they have a higher capacity factor than both wind and solar, conventional hydro-electricity is both intermittent and national-grid reliant.

Thus, conventional hydro is not a suitable solution for an EV charging network which can operate "off-grid" as they are not designed to be always on and they require a grid connection.

Geothermal

Geothermal can achieve CF>70%. However, periodic (sometimes permanent) sub-surface cooling occurs due to geothermal operation (injection of water into hot sub-surface rock strata). This can cause unexpected outages of generation and even the permanent cessation of generation. This phenomenon is extremely difficult to predict. Furthermore, the average lifetime of a geothermal generating plant is 30 years. A well-maintained hydro-electric plant will have a life span double or triple that of a geothermal plant of the same power output. Finally, geothermal can cause atmospheric emissions of sub-surface chemicals. Thus, geothermal is a secondary option to hydro-electricity.

Energy-Storage

Any isolated "off-grid" "micro-grid-island" or "no-grid" device must perfectly balance generation and load. A grid-scale battery may be used for electricity balancing. Grid-scale batteries are also used to store electricity generated for use at a later time (energy-storage). However, battery storage is expensive, and installation costs are currently up to US$0.3 million per MWh. For example, the Hornsdale Power Reserve in Australia (the "Tesla big battery") installation in 2017 cost about US$50 million for 129 MWh.

EVs Charged with Fossil Fuels

The data in Tables 1 and 2 above, and the graphical data illustrated in FIGS. 1 to 3 provides evidence of the limits of current conventional renewable energy sources and systems used therefore, indicating that they are not able to deliver dispatchable power. Particularly where a dispatchable supply of electricity is required, such as a commercial EV charge point, the energy sources above would not be useful on their own. As such, the remainder of the electricity supply would have to be supplemented by electricity generated by burning fossil fuels.

In the vast majority of cases, EV charge points receive all their electricity from non-renewable sources, therefore the objective of clean mobility is not achieved. With respect to delivering energy to power vehicles, it is actually more efficient to burn non-renewable energy sources in internal combustion engines rather than in power stations. The generation of electrical energy for EVs in power stations is less efficient because of losses in transmission between the power station and the EV and then there is the requisite new infrastructure that is required for EVs; it is more environmentally harmful than simply having an ICE vehicle burn the fuel. Not all charge points will have a 'green tariff' option, therefore the user is further limited in terms of distance if they want to ensure their emissions are being reduced.

When charged using energy generated from fossil fuels, EVs cause more damage to the environment than ICE vehicles.

Grid and Transmission

There are logistical issues to providing EV charge points which are in "off-grid" locations. Mountainous, remote, impassable and low-population regions, for example, present physical obstacles to installing complete coverage of suitable national grid infrastructure.

It is known in the art that as power output of an electricity generation unit is decreased, the distance that it is feasible to transmit the generated energy also decreases, due to resistance losses and transformer costs. Transformers are required to convert electricity into high voltage alternating current to reduce transmission losses. For example, using technical and cost-benefit analysis, the maximum feasible transmission distance is around 20 miles for 1,000 kilowatts (kW) of power using AC. Thus, there are also isolated remote hydro-electric resources which cannot utilise the grid and lie undeveloped.

As detailed above, when one considers that to deliver 1 MW of dispatchable solar one would need at least 20 MW of installed solar panel capacity and a battery with an energy-storage capacity of more than 60 MWh, it is self-evident why no such system has been built let alone commercially operated. 100% Renewable "off-grid" EV charge points are therefore not particularly attractive to business developers, and/or have not previously been feasible to build.

Therefore, there is a desire to provide EV charge points in off-grid locations. Additionally, there is a consumer desire to maximise the availability and use of 'green' EV charging (i.e. charging with electricity which has been generated from non-fuel, non-emission sources). Further still, there is a desire to provide an EV charge point which is capable of operating 100% of the time, i.e. by having a 100% capacity factor. Additionally, it is desirable to provide a commercially viable system for off-grid EV charge points.

Dispatchable Power in Off-Grid Locations

The same issues as above apply for the provision of dispatchable off-grid power for other uses i.e. the data in Tables 1 and 2 above, and the graphical data illustrated in FIGS. 1 to 3 provides evidence of the limits of current conventional renewable energy sources and systems used therefore, indicating that they are not able to deliver dispatchable power. Particularly where a dispatchable supply of electricity is required, such as for provision of on-demand power for domestic, business (commercial) or industrial applications, the energy sources above would not be useful on their own. As such, the remainder of the electricity supply would have to be supplemented by electricity generated by burning fossil fuels, e.g. with diesel generators.

Dispatchable On-Grid Power

The "Energy Trilemma"

For all power supplies, and on-grid power in particular, there is an "energy trilemma" posed by the competing demands of (i) sustainability, (ii) energy security and (iii) affordability. Solving this trilemma is the aim of all governments and is a component of the Paris Agreement.

100% Renewable Policy

Several countries have adopted a policy of moving to only renewable (sustainable) energy sources within one to four decades. The objective is zero emissions of harmful pollutants with an emphasis on carbon dioxide. Consequently, the other two poles of the "Energy Trilemma" (energy security and affordability) are coming under enormous and increasing negative pressure.

Electricity Grid Operations

Electricity grid operators have two distinct technical tasks. One is to maintain the balance and stability of the grid, and the other is to deliver electricity between generators and end-users across the grid. Electricity grid stability is a prerequisite for energy security. It is required for technical reasons to prevent outages (a loss of energy) and damage to equipment caused by changes of, for example, the voltage and/or frequency of the energy (electricity) being delivered to end-users. Maintaining grid stability while load usage patterns vary instantaneously is a complex task, and even small deviations from the set parameters can have severe consequences. The difficultly of maintaining instantaneous balance is exacerbated if generation is unpredictably variable.

The provision of dispatchable, on-demand power to the grid from renewable resources is therefore particularly advantageous, and by supporting grid stability helps support the "energy security" pole of the energy trilemma.

Generation Variability

Wind and solar power generation are variable in their power output. The problem with variability is that it delivers intermittent energy, disrupts grid stability and thus diminishes energy security. Thus, additional power sources are required e.g. fossil fuel or nuclear.

Dispatchable Electricity

The dilemma posed by renewable energy and the "energy security" pole of the energy trilemma is recognised at e.g. www.entura.com.au/dispatchable-renewables-a-contradiction-in-terms/(Entura; Lee, T., July 2017, "Energy Storage in PJM") and kleinmanenergy.upenn.edu/sites/default/files/Energy%20Storage%20in%20PJM.pdf (the Kleinman Centre at the University of Pennsylvania), which states that "intermittent renewables . . . cannot be dispatched"

Overcapacity

Technically speaking, it may be possible to create enough over-supply of non-emitting renewable electricity generation to ensure both sustainability and energy security. However, this would put massive upward pressure on affordability, the third pole of the Energy Trilemma. As such, overcapacity is not a viable solution.

Technical Qualification: Dispatchable Energy

To participate in dispatchable energy markets: (e.g. PJM, the biggest electricity grid operator in the world), a system must deliver 75% dispatchable power in three tests (PJM Manual 12—Balancing Operations at section 4.5.2—www.pjm.com/-/media/documents/manuals/m12.ashx?la=en.

Technical Qualification: Synchronised Reserve Capacity Markets

Renewables are barred from this market (PJM Manual 11 at section 4.2.1—www.pjm.com/-/media/committees-groups/committees/mic/20180404/20180404-item-06b-manual-11-revision-94.ashx): "Tier 1 estimates for other resource types that cannot reliably provide Synchronized Reserve service shall be set to zero MW during the market clearing process. Such resource types include, but are not limited to: Nuclear, Wind, Solar, Energy Storage Resources, and Hydro units." However, "A resource may be certified only after it achieves three consecutive scores of 75% [quality load standard] or above" (PJM Manual 12: Balancing Operations Revision: 39—Section 4.2.5 www.pjm.com/-/media/documents/manuals/m12.ashx?la=en), which the present invention's dispatchable nature, will be able to pass.

Technical Qualification: 8 to 10-Hour Storage Discharge

The technical requirements resulting from Lee, T., July 2017, "Energy Storage in PJM" (above) include the requirement that to enter the capacity markets a battery must conform to a 10-hour shut out from recharging (see e.g. www.utilitydive.com/news/pjm-ceo-sees-ferc-storage-order-as-threat-to-demand-resource-penetration-in/554877/). In that article, energy storage officials explicitly recognise the issue and state concerns about the 10-hour discharge requirement within PJM's capacity market, as technological advancements have not yet yielded 8-hour or 10-hour continuous battery duration."

The present invention seeks to improve upon the prior art and/or address, overcome or mitigate at least one of the prior art disadvantages.

SUMMARY OF THE INVENTION

According to the present invention there is provided a dispatchable off-grid power supply having a dispatchable power output ($P_D$) of at least 25 kW, the dispatchable off-grid power supply comprising:

(i) a base power generator selected from at least one of the group consisting of: a hydroelectric power generator, and a geothermal power generator;

(ii) a secondary power generator comprising at least one renewable power generator;

(iii) a battery; and (iv) power transmission means for communicating the generated power to an at least one consumer.

The dispatchable power supply can also be referred to as being a dispatchable power supply system.

In certain embodiments, the dispatchable power supply is a dispatchable off-grid power supply. In certain embodiments, it is a dispatchable off-grid power station. In certain embodiments, it is an off-grid electric vehicle charge station.

In certain embodiments, the power transmission means is an at least one electrical vehicle charge point. Thus, the consumer is an at least one electrical vehicle. In such embodiments, the dispatchable power supply can be an off-grid electric vehicle charge station.

In certain embodiments, the consumer is a grid connection, i.e. the consumer is an electrical grid or a consumer located on an electrical grid.

Where the consumer is a grid connection, the battery is preferably located adjacent the grid connection, for example adjacent or at a sub-station. In such embodiments, a transformer and inverter may be provided for the transmission of generated power to the battery/sub-station as AC.

Optionally, the power supply can support "black start", for example with a power output and service duration as specified by a local grid operator.

Optionally, the power supply may be provided with additional battery storage for load balancing (i.e. absorbing energy) from the consumer, for example as specified by a local grid operator.

The base power generator may also be referred to as the primary power generator.

In certain off-grid embodiments, the dispatchable power supply is standalone. Preferably, the dispatchable power supply is not connected to a micro-grid. In certain embodiments, the dispatchable power supply is not connected to any grid.

Base Power Generator

Preferably the base power generator is hydroelectric power generator. In certain embodiments, a geothermal power generator is used as the base power generator.

Preferably, the hydroelectric power generator is in fluid flow communication with a water source. The water source may be a river, a dam, a waterfall, underground river, etc. Preferably, the water source is a river. Preferably, the hydroelectric power generator is a "run-of-river" type.

A particularly preferred hydroelectric power generator is that disclosed in WO 2010/020779, wherein the main components of the generator are stored underground, and the environmental impact is therefore reduced significantly. However, it will be apparent to those skilled in the art that other hydroelectric power generators may also be used, and the present invention is not intended to be limited in this regard.

In certain embodiments, the base power generator has a maximum power output ($P_{B\text{-}Installed}$) equal to or greater than the dispatchable power output ($P_D$). When $P_{B\text{-}Installed}$ is greater than $P_D$, the additional size of $P_{B\text{-}Installed}$ minus $P_D$ is referred to as $P_{B\text{-}Oversize}$.

In certain embodiments, the base power generator has a maximum power output ($P_{B\text{-}Installed}$) equal to the dispatchable power output ($P_D$).

$$P_{B\text{-}Installed} = P_D + P_{B\text{-}Oversize}$$

Preferably, the base power generator has an annualised capacity factor ($CF_B$) of at least 50%. Preferably, the capacity factor of the base power generator is at least 60%. More preferably, it is at least 70%. More preferably, it is at least 80%. More preferably, it is at least 90%.

In certain embodiments the capacity factor of the base power generator ($CF_B$) is less than 100%. In some embodiments, it is less than 99%. In some embodiments, it is less than 95%.

Hydroelectric power generators are preferable for the base power generator because they are generally more predictable in terms of their electrical power output than geothermal. Hydro-electric plants also have a longer lifespan than geothermal. Those familiar with the art will know that wind and solar generation rarely if ever attain capacity factors above 50%, which is the minimum requirement for the base power generator in this invention. Thus, for this reason and reasons explored below, neither solar nor wind could be deployed as the primary generator for this Invention.

As will be explored below, hydro-electric installations can be designed and engineered to deliver a higher annualised capacity factor. This is in contrast to solar and wind energy which rely on unpredictable weather patterns. In particular, water flow is much more predictable than wind speed.

Although there are daily, seasonal, and annual variations in hydro-electric generation, these are, again, predictable. In any case, fluctuations in water flow (and thus generation) are much less extreme than they are with both wind and solar (e.g. night and day), thus making water flow a more reliable source of energy. A hydroelectric power generator will generate twenty-four hours a day, provided there is sufficient water flow. Run-of-river hydroelectric power generators are particularly advantageous in the present invention because such generators can be designed and engineered according to the site specifications, so as to provide a desired capacity factor ($CF_B$). And therefore, the dispatchable power supply can be constructed and configured accordingly. Furthermore, run-of-river can be small scale and have an ultra-low environmental impact.

Where the base power generator is a hydroelectric power generator, it may be configured or adapted such that power generation can be reduced or stopped. For example, it may be configured or adapted such that water flow through the turbine may be reduced or switched off at times of peak operation of the secondary power generator. Thus, this can act as a control mechanism, in order to balance the electricity in its system. It is counter-intuitive not to produce as much energy as possible from a generation system. However, in this invention, excess-energy (i.e. instantaneous power output greater than $P_D$), is sacrificed (by simply reducing or switching of generation from the hydro generator) in order to maintain energy balance within the system; and thus, system integrity.

Thus, preferably the dispatchable power supply additionally comprises control means (for example, a control module) which reduces or stops power generation by the base power generator.

In order to ascertain the average power ($P_{B\text{-}Average}$) that will be generated from the base power generator, the maximum power output of that generation, which is its installed capacity ($P_{B\text{-}Installed}$) is multiplied by the base power generator capacity factor, $CF_B$. Preferably, the base capacity factor, $CF_B$, is an average annualised capacity factor. Given by:

$$P_{B\text{-}Average} = P_{B\text{-}Installed} \times CF_B$$

In order to ascertain the average 'missing' energy, $P_{B\text{-}Average}$ is subtracted from $P_D$ to provide the average missing power ($P_{M\text{-}Average}$), (if any), required from a secondary power generator source, given by:

$$P_{M\text{-}Average} = P_D - P_{B\text{-}Average}$$

This result is essential for initial site prospecting, ranking, inter-site comparison, initial site design iteration and first-pass feasibility analysis. However, averages are not sufficient for final system design.

Engineering Capacity Factor

The following provides an example of how hydroelectric power output can be engineered by varying the relevant parameters. Hydropower output is determined using the following equation:

$$P = g \times v_f \times h \times e;$$

Where:
P is the output power (kW)
$g = 9.8$ m/s$^2$ is acceleration due to gravity in metres per second squared;
$v_f$ is the volumetric flow of water in cubic metres per second (m$^3$/s);
h is the head (vertical height) in metres (m); and
e is the efficiency, which is a coefficient value. This is given as the percentage of power that remains after system losses due to inefficiencies (e.g. friction, resistance, etc., but excluding losses in transmission of energy).

As the capacity factor of the base power generator is increased, the power output reduces. Therefore, there is a trade-off (which can be calculated independently for each site) and a maximum capacity factor for which the hydroelectric power generator becomes ineffective and/or commercial unsuitable. Therefore, capping the capacity factor at the point wherein the hydroelectric power generator is still usefully effective may be around 50%, and up to 100%.

It is possible to control the $CF_B$ for any given hydroelectric power generator by sizing its 'Turbine Design Flow', which determines the installed maximum power capacity $P_{B\text{-}Installed}$. It will be apparent to those skilled in the art that the power output and design of the turbine will affect the $CF_B$. As previously discussed, $CF_B$ is calculated as the average percentage of the time that the power generator system is effectively operating at full capacity, over one year. The power output of a hydroelectric power generator is proportional to the 'Turbine Design Flow'. In a "run-of-river" hydroelectric power generator a lower power output (and therefore a lower 'Turbine Design Flow') corresponds to a larger percentage of time that the system will generate at maximum power, a higher $CF_B$.

Sizing the total potential power output capacity of a hydroelectric site requires hydrological modelling, as every site is unique. It is known in the art and will be known to those skilled in the art, that historical flow data of a particular site can be modelled into a Flow Exceedance, or Flow Duration Curve. A Flow Exceedance Curve has a percentage of time axis (e.g. the x-axis) and a water flow axis (e.g. the y-axis). The curve shows probabilities of what flow is equalled or exceeded for each percentage of time. FIG. 5 shows an exemplary Flow Exceedance Curve for a site in Scotland. Flood conditions make the curve non-linear.

Therefore, the average flow, $Q_{mean}$, generally falls around 30%, rather than 50%. In the example site illustrated in FIG. 5, $Q_{mean}$ is approximately 2.65 m³/s. Flow Exceedance Curves are normally modelled for a year and provide valuable data which can be used when selecting a site suitable for a hydroelectric power generator.

Maximum flow through the turbine (power output) can therefore be designed using conventional hydrological modelling and through iterative methods, using the equation above and accounting for losses due to friction and operating efficiency of the specific Hydroelectric power generator system. Therefore, it is possible for the operative to adjust the 'Turbine Design Flow' of the hydroelectric power generator in order to maximise the value of CF of the system. From calculating the power output (or predicted power output) it is then possible to obtain a precise historical value for the capacity factor of a hydroelectric power generator placed at that site.

Firstly, the power output is calculated at various 'Turbine Design Flows', i.e. iteratively. Following this, the total energy-generated per year is calculated. Finally, the system annualised generation capacity factor CF is calculated, using the following formula:

$$CF = \frac{\text{Actual Energy Output(MW} - h)}{\text{Power(MW)} \times 8760}$$

The table below shows an example of the iteration and the relationship between flow, power, and energy on the same Scottish site referred to in FIG. 5. Each site will give different results, but the overall trends are similar in each case.

TABLE 3

| Turbine Design Flow (m³/s) | Power (MW) | Annual Energy (GWh) | Generating Capacity Factor |
|---|---|---|---|
| 5.81 | 8.58 | 22.6 | 30% |
| 4.22 | 6.24 | 21.6 | 40% |
| 3.04 | 4.49 | 19.7 | 50% |
| 2.27 | 3.36 | 17.7 | 60% |
| 1.73 | 2.56 | 15.7 | 70% |
| 1.35 | 1.99 | 13.9 | 80% |
| 1.03 | 1.52 | 12.0 | 90% |
| 0.58 | 0.86 | 7.5 | 100% |

Thus, at this site, a 'Turbine Design Flow' of 1.03 m³/s will be needed to operate a 1.52 MW power hydroelectric turbine, delivering an electricity generation capacity factor of 90%. Equally, constructing a hydroelectric system at this site, with a lower capacity factor, will generate more energy per year.

Assuming a fixed wholesale price for electricity, it will be evident that more money is made from a lower capacity factor, since lower capacity factors generate more electricity per year. Those familiar in the art know that this stops being true below around 30% capacity factor. The present inventors have found that run-of-river hydroelectric power generators can achieve very high capacity factors by significantly reducing power output. In the prior art, it is not commercially desirable to reduce the power output of a power generator (renewable or otherwise) because the result is less energy which can be sold.

Extracting less water has the added important design objective and benefit of causing proportionately less direct environmental impact.

Because of this ability to adjust the capacity factor by altering the 'Turbine Design Flow', hydroelectric power generators provide the necessary features to allow for a reliable power generation off-grid.

A first counter-intuitive step of this invention is to use very high hydroelectric power generator capacity factors, thus reducing the energy that could be produced at the site. The intentional sacrifice of energy generation is rewarded with a significant increase in both generation reliability, predictability and system stability. Preferably, the capacity factor of the base power generator is at least 50%. In some exemplary embodiments the capacity factor is at least 60%. Preferably, for the reasons listed above, it is at least 70%. More preferably it is at least 80%. Ideally it is at least 90%.

In order to achieve dispatchable power output equal or greater than the maximum power output of the base power generator, the present invention includes at least one type of secondary power generator, and an energy-storage device (described in more detail hereinafter) in order to continuously and perpetually balance load and generation within the Invention.

Secondary Power Generator

The secondary power generator preferably comprises one of the following types of renewable energy generators: solar and wind.

While solar and wind are either inherently unpredictable, vary extremely on a daily basis or both; these two renewable energy sources both offer the ability to provide back-up power generation. This is a second counter-intuitive step of the solution provided by the present invention, commercial solar and wind farms are normally grid-connected.

It is known in the art that particularly dry days which may result in a reduction of hydroelectric power generation often coincide with days of high solar radiation. Both wind and solar are suitable candidates for the purpose of back-up power generation. Preferably, the second power generator is a solar power generator because the sunniest days often coincide with the days with the lowest water flow.

It has already been seen that solar radiation is more predictable than wind speed variation (ref. FIGS. 1 to 3 of the drawings), therefore the secondary power generator is preferably a solar power generator. This may include, but is not limited to a photovoltaic system array, concentrated solar power (CSP) units, or a combination.

Suitable wind power generators include, but are not limited to, onshore wind turbines, offshore wind turbines, horizontal axis wind-turbines, vertical axis wind turbines, and other suitable wind power generation systems known in the art. Naturally, one or more wind turbines may be provided as appropriate.

In certain embodiments, the secondary power generator comprises a combination of wind and solar energy generators so as to provide the most reliable power source to the local conditions.

Installed Secondary Capacity

In some embodiments, the dispatchable power supply has a peak instantaneous non-base required power output ($P_{M-Peak}$) Those familiar to the art will know that a conventional hydrological analysis of a particular site, will provide a historical record of water flow in for example 1, 5, 10 or 15 minute increments. Such an analysis of a particular site will calculate the instantaneous minimum power output from the base power generator, ($P_{B\text{-}Low}$):

$$P_{M\text{-}Peak} = P_D - P_{B\text{-}Low}$$

Those familiar with the art will know that analysis tools exist to predict the solar radiation or wind speed at any particular location. The art then allows for the calculation of capacity factors for solar and wind respectively, as they both have different capacity factors for any particular location. Design iteration using this analysis is conducted by the operator to choose what proportion of $P_{M\text{-}Peak}$ will be generated by solar, and if there is a wind component what that will be. The split of secondary generation, if any, is represented by ($S_S$) and ($S_W$) which are two percentages which total 100%. ($S_W$) is determined by the value of ($S_S$). The size of the Solar component determines the wind component because solar is preferred as a secondary power generator above wind, for reasons explained above. The missing power required from solar is given by:

$$P_{S\text{-}Required} = P_{M\text{-}Peak} \times S_S$$

And for wind is given by:

$$P_{W\text{-}Required} = P_{M\text{-}Peak} \times S_W$$

$CF_{Secondary}$, is the average periodic capacity factor for only those days, or part thereof, when a base power generator is generating less power than the dispatchable power, ($P_D > P_B$). The required installed power generating capacity of a secondary power generator is given by:

$$P_{Secondary\text{-}Installed} = P_{M\text{-}Peak} \times \left(\frac{1}{CF_{Secondary}}\right)$$

$CF_{Secondary}$ has different values for solar and wind; $CF_S$ and $CF_W$ respectively. Where there are both solar and wind components of the secondary power generator the equation above is employed separately for both technologies. The installed power for solar is given by:

$$P_{S\text{-}Installed} = P_{S\text{-}Required} \times \left(\frac{1}{CF_S}\right)$$

And for wind is given by:

$$P_{W\text{-}Installed} = P_{W\text{-}Required} \times \left(\frac{1}{CF_W}\right)$$

Energy-Storage Power Rating

Those familiar with the art will know that in an electrically isolated system, an energy-storage device must have a Power Rating which is equal to, or greater than, the peak output of generation sources that are connected to it. Power Rating describes the instantaneous maximum power capacity of the energy-storage device to charge or discharge.

The base power generator is designed to run at 100% capacity factor for as long as possible. Thus, the Power Rating of the base power generator $PR_B$ is equal to its maximum instantaneous power output, given by:

$$PR_B = P_{B\text{-}Installed}$$

Preferably, a single (wind or solar) secondary power generator has an instantaneous peak capacity factor ($CF_{Secondary\text{-}Peak}$), which is calculated at the appropriate point in time e.g. the sunniest instant or the highest operable instantaneous wind speed. The Power Rating required for a secondary power generator ($PR_{Secondary}$) is given by:

$$PR_{Secondary} = P_{Secondary\text{-}Installed} \times CF_{Secondary\text{-}Peak}$$

Solar and wind have different peak capacity factors, $CF_{S\text{-}Peak}$ and $CF_{W\text{-}Peak}$. Using the equation above, The Power Rating for solar is given by:

$$PR_S = P_{S\text{-}Installed} \times CF_{S\text{-}Peak}$$

And the Power Rating for the wind component is given by:

$$PR_W = P_{W\text{-}Installed} \times CF_{W\text{-}Peak}$$

When there are both solar and wind components of the secondary power generator the Power Ratings for solar and wind are combined to give the Power Rating for the secondary power generator, given by:

$$PR_{Secondary} = PR_S + PR_W$$

The primary Power Rating does not need to be added to the secondary power rating. As seen above hydro-electric generator can be controlled by lowering water intake (and thus instantaneous generation). At those times when the secondary power generator is peaking, the Invention controls power input to the energy-storage device can be controlled (for example, using a control module, see below) by reducing or stopping the generation from the base power generator.

Preferably, the energy-storage device has a power rating for storage ($PR_{Installed}$) at least equal to the greater of:
(a) $PR_B$, and
(b) $PR_{Secondary}$ wherein
  $PR_B$ is the power rating requirement from the base power generator and which is equal to or greater than the base power generator maximum power output ($P_{B\text{-}Installed}$); and
  $PR_{Secondary}$ is the power rating requirement from the secondary power generator and which is equal to or greater than $P_{Secondary\text{-}Installed} \times CF_{Secondary\text{-}Peak}$, wherein $CF_{Secondary\text{-}Peak}$ is the instantaneous peak capacity factor of the secondary power generator.

In certain embodiments, for example those where the full capacity of the battery is to be discharged in a short period of time or where there is no $PR_{Secondary}$, the desired rate of power consumption may be greater than $PR_{Installed}$. For example, in embodiments where the at least one consumer is an at least one electric vehicle charge point (for example a plurality of electric vehicle charge points, more particularly a plurality of electric vehicle charge points designed to operate simultaneously), $PR_{Installed}$ can be at least equal to the total power output of the at least one electric vehicle charge point. Thus, in an embodiment with the at least one electric vehicle charge point comprising one 350 kW charge point, one 150 kW charge point, two 50 kW charge points and five 7 kW charge points all designed to operate simultaneously, $PR_{Installed}$ can be at least equal to 635 kW.

Energy-Storage Capacity

Preferably the energy-storage uses the most efficient technology presently available: Grid-scale battery is currently the preferred form of energy-storage device and is referred to below, and the present invention is not intended to be limited in this regard.

Storage is measured by energy in for example kilowatt-hours (kWh), megawatt-hours (MWh), or Gigawatt-Hours (GWh). To calculate the required minimum storage for the Battery, each generator technology must be dealt with separately. The inventors have determined that the minimum required energy-storage for the base power generator ($ES_B$) is given by:

$$ES_B = P_{B\text{-}Installed} \times 0.5$$

And for Solar ($ES_S$) is given by:

$$ES_S = PR_S \times 3$$

And for wind ($ES_W$) is given by:

$$ES_W = PR_W \times 10$$

The required energy-storage capacity for a secondary power generator (ES Secondary) is given by:

$$ES_{Secondary} = ES_S + ES_W$$

The required energy-storage capacity for installation ($ES_{Generators}$) is given by:

$$ES_{Generators} = ES_B + ES_{Secondary}$$

Preferably, the secondary power generator is not a hydro-electric power generator or a geothermal power generator.

Operational Hours

In certain embodiments it may not be desirable or necessary to provide dispatchable power 24 hours a day. For example, for commercial or industrial premises, set operating hours may mean that the dispatchable power supply only has to be provided during those operating hours.

For example, where the dispatchable power supply is an EV charge station, for several reasons, an operator may decide, or may not be able, to open the EV charge station for 24 hours a day. For example, in some national-parks vehicle access is restricted during the hours of darkness. Conversely, for example, there is envisaged an operator of autonomous vehicles which may only operate during the hours of darkness.

If power from the dispatchable power supply is not consumed 24 hours per day with a reasonably steady load, e.g. if the EV charge station is not operated 24 hours per day with a reasonably steady load of charging vehicles, then additional energy-storage may be required. Where T is the operational time (in hours per day).

The minimum storage required to charge the battery while power from the dispatchable power supply is not being consumed (e.g. an EV station such as an off-grid electric vehicle charge station is not charging vehicles) ($ES_{Downtime}$), is given by:

$$ES_{Downtime} = P_D \times T$$

Thus, the total energy-storage battery capacity requirement, accounting for operational hours less than 24 hours a day ($ES_{Installed}$), is given by:

$$ES_{Installed} = ES_{Generators} + ES_{Downtime}$$

Reducing operating load charging hours commensurately increases the dispatchable power that can be delivered during operational hours. The increase in dispatchable energy for the reduced hours ($P_{D\text{-}Bonus}$) is given by:

$$P_{D\text{-}Bonus} = ES_{Downtime}/T$$

For example, by only operating for 12 hours a day the effective dispatchable power can be doubled for the 12 operational hours.

Alternatively, the operator may decide to turn off the invention while it is not operational. The dispatchable power would remain constant at ($P_D$) during operational hours. This embodiment would remove the need for the extra capital cost of batteries for $ES_{Downtime}$.

The inventors envisage that some operators may start site operation without storage capacity to charge energy generated while power from the dispatchable power supply is not being consumed (e.g. the EV charge station is 'closed' (i.e. not charging EVs)). As demand for power from the dispatchable power supply increases (e.g. demand for EV charging increases with EV vehicle sales), the additional storage can be installed, and paid for by revenues earned from the initial installation.

Battery

The battery is any suitable component suitable for storage of electrical energy. It may include a plurality of battery cells or capacitors coupled together as will be known in the art, and the present invention is not necessarily intended to be limited in this regard. The battery is required for several technical reasons:

(a) the battery system offers support to both the primary and secondary power generation systems. It does this by offering the ability to manage the power output from the entire system, as well as the energy within the system.

(b) The battery can be charged and discharged in a fraction of a second, allowing it to keep the generation profile smooth despite any faults or interruptions that the primary or secondary power generation systems experience.

(c) The battery system can also hold charge and energy, allowing it to shift the power profile to meet a variable demand.

(d) This allows for a reliable and robust system, able to balance and maintain itself, and function independent of an external grid infrastructure, instead able to utilise, to a maximum efficiency, one or more complimentary renewable generation sources to provide power. Batteries are required to be able to marry the independents power generators in order to deliver a predictable dispatchable power.

Battery installation costs are currently up to US$0.3 million per MWh. Therefore, in order to keep the cost of the system down (therefore making it a commercially viable solution), it is desirable to reduce the battery storage capacity as much as possible.

When the base power generator is hydro, and to reduce the required battery capacity, water flow into the base power generator can be reduced or stopped. This means that at times of peak power output by the secondary power generator the base power generator can be switched off. This reduces the requirement for additional battery capacity to store energy from the base power generator while the secondary power generator, (which as we have explored above is less predictable), is peaking.

Dispatchable Power Output

Preferably, the dispatchable power supply has a total dispatchable power output ($P_D$) of at least 25 kW. More preferably, the dispatchable power supply has a total dispatchable power output ($P_D$) of at least 50, 75, 100, 200, 250, 300, 400, 500, 750 or 1000 kW. In certain embodiments, the total dispatchable power output is greater than 1000 kW.

Where the dispatchable power supply is an at least one electric vehicle charge point, the at least one electric vehicle charge point may be a plurality of electric vehicle charge points so that more than one EV can be charging at the same time in a single EV charge station.

Control Module

Preferably, the dispatchable power supply additionally comprises a control module.

The control module preferably comprises control circuitry and/or control means configured to control the power output from the base power generator and/or the secondary power generator, and to control the provision of power to and from the battery. Preferably, the control module is configured to deliver the total dispatchable power output ($P_D$) from the base power generator, the secondary power generator, and the battery. Exactly how this is done will depend on a variety of factors, for example the time of year, the weather conditions (the amount of sun, wind and rain and corresponding available water for the hydroelectric power generator). Preferably, where the base power generator is a hydroelectric power generator, the base power generator comprises an actuator, switching or control means to control the power output from it. For example, in embodiments where the base power generator is a hydroelectric power generator, this may be in the form of a movable barrier or valve system which controls the flow of water into (i.e. the ingress of water into) the hydroelectric power generator. In embodiments where the secondary power generator is a wind generator, the wind generator may comprise control means to control the power output from it, for example by changing the angle of the blades of the wind power generator. Where the secondary power generator is a solar power generator, it may comprise control means to adjust the positioning or angle of the solar cells in order to control the power output from them. The above examples are non-exhaustive, and suitable control means are well known and will be readily apparent to the person of ordinary skill in the art.

For example, in an embodiment where the base power generator is a hydroelectric power generator, and the secondary power generator is a solar power generator, the control means may be configured to control the amount of power generated by the hydroelectric power generator. For example, where sufficient power can be generated by the secondary power generator (the solar power generator), it may be desirable to reduce the power generated by the base power generator (the hydroelectric power generator) in order to reduce the amount of water used and/or to avoid the generation of excess electrical power.

Preferably, the control means is adapted or configured to control power provided to electric vehicles. Preferably, the control means comprises communication means, for example data communication means such as mobile telephony, cellular data, or satellite communication means. Preferably, the control means is adapted or configured to communicate with transaction processing means in order to obtain and/or provide authorisation for charging and invoicing for charging.

Preferably, the control module comprises a computer or database configured to manage the power output of the base power generator and the secondary power generator, and the battery, so that the dispatchable power output, ($P_D$), remains constant. It will be apparent to those skilled in the art that known management software may be suitable for this purpose.

The control module also enables the delivery of different power charging levels for different EVs across time.

DC Power Transmission

Preferably, output electrical power from the various components is DC (direct current). Preferably, electrical power transmission between the various components is DC.

Preferably, the dispatchable power supply is configured or adapted for electrical power transmission between the various components as DC.

Preferably, the electrical power transmission system between the various components is a DC electrical power transmission system.

Preferably, the electrical interconnections between the various components are DC electrical interconnections.

More preferably, this is with regard to the base power generator, the secondary power generator, and the battery.

More preferably, this is with regard to the base power generator, the secondary power generator, the battery, and the at least one electric vehicle charge point.

Preferably, the electrical power connections between the individual components is over a distance of no greater than 4 km (i.e. less than or equal to 4 km).

Power generators such as hydroelectric, geothermal, wind and solar power generators produce a direct current (DC) energy output. The DC electrical power output is converted into AC (alternating current) for transmission, in particular for connection to and transmission to local and national grids. This conversion requires the use of DC to AC inverters and voltage transformers. This introduces significant losses in the form of inverter losses and transformer losses, together with capital costs for the inverters and transformers.

Preferably, the dispatchable power supply does not include a >5 Kw inverter.

Such embodiments can be particularly useful in providing a dispatchable power supply which is resilient to sun storms or other electromagnetic events. In particular, the lack of transformers/inverters reduces susceptibility to damage from electromagnetic events.

In certain embodiments, the component parts of the dispatchable power supply and the consumer are located within a 10 km radius. In certain embodiments they are located within a 5 km radius. In certain embodiments they are located within a 2 km radius. In certain embodiments they are located within a 1 km radius. In certain embodiments they are located within a 500 metre radius. The provision of such a constrained radius reduces the potential for electrical induction and subsequent damage caused by an electromagnetic event.

In certain embodiments, the dispatchable power supply is also provided with spare parts located within a Faraday cage. In such embodiments, the spare parts are not electrically connected to the base power generator, secondary power generator (where present), battery or power transmission means.

Electric Vehicle Charge Point

Electric vehicle charge points are well known in the art and will be readily apparent to the skilled person. Preferably, the at least one electric vehicle charge point comprises the known features of existing electric vehicle charge points including, but not limited to, charging power electronics, a charging connector, cabling for transmitting power from the power electronics to the charging connector.

Preferably, the at least one electric vehicle charge point includes suitable safety measures as will be known in the art to prevent short circuiting, electrical blow-outs, power surges, and the like.

Preferably, the dispatchable power supply (for example an off-grid charge station) comprises a plurality of electric vehicle charge points so that more than one EV can be charged at any given time.

Preferably, the at least one electric vehicle charge point has a power output of at least 7 kW. Preferably the power output is at least 10, 20, 30, 40, 50, 130, 150, 350, 500 or 1,000 kW.

Preferably, the dispatchable power supply is an off-grid electric vehicle charge station. Preferably it comprises at least one electric vehicle charge point, more preferably a plurality of electric vehicle charge points and is configured and/or adapted for multiple simultaneous charging and continuous service.

Electric Vehicles

Electric vehicles include any and all electrically propelled vehicles which can be charged using the dispatchable power supply of the present invention. In particular, they include but are not limited to cars, vans, lorries, buses, coaches, motorcycles and motorbikes (more particularly, electric motorcycles and motorbikes), mopeds, light vehicles, medium sized vehicles, large vehicles, quad bikes, minibuses, tractors and other agricultural vehicles, tracked vehicles, bicycles, and boats.

Base Power Generator Only

According to a second aspect of the present invention, there is provided a dispatchable power supply having a total dispatchable power output ($P_D$), of at least 25 kW, the dispatchable power supply comprising:
 (i) a base power generator selected from at least one of the group consisting of: a hydroelectric power generator, and a geothermal power generator;
 (ii) a battery; and
 (iii) power transmission means for communicating the generated power to an at least one consumer.

The dispatchable power supply can also be referred to as being a dispatchable off-grid power supply system.

In certain embodiments, the dispatchable power supply is a dispatchable off-grid power supply. In certain embodiments, it is a dispatchable off-grid power station. More preferably, it is an off-grid electric vehicle charge station.

In certain embodiments, the power transmission means is an at least one electrical vehicle charge point. Thus, the consumer is an at least one electrical vehicle.

It will be apparent to those skilled in the art that in regions where the weather is reasonably predictable (i.e. the river flow or water source flow is exceptionally predictable, such as minimum environmental releases at a non-powered dam) it will be possible to achieve 100% capacity factor throughout the year. Therefore, the present invention provides a reliable, always on, completely off-grid and renewable energy-sourced EV charge point.

Preferably, the base power generator is a hydroelectric power generator.

Preferably, the battery has a power rating from the primary power generator ($PR_B$) which is equal to or greater than the Installed capacity of the base power generator ($P_{B-Installed}$).

Resilience

In embodiments where theTo enhance the resilience of the dispatchable power supply, for example to sun storms or other electromagnetic events, In embodiments where the dispatchable power supply is provided in a site with limited accessibility (for example, a significant distance from a major population centre) For off-grid dispatchable power supplies in particular, Further Aspects Also provided according to the present invention is a method of charging an electric vehicle, the method comprising the steps of placing the vehicle in electrical charge connection with the dispatchable power supply (e.g. with an at least one charge point), and charging the electric vehicle. In particular embodiments, the dispatchable power supply is a dispatchable off-grid power supply.

Preferably, the electric vehicle is connected to the dispatchable power supply (the at least one charge point) by a charge cable. The charge cable can be a cable assembly. The charge cable/cable assembly is used to establish a connection (an electrical charging connection) between the electric vehicle and the charge point. Preferably, the charge cable/cable assembly is fixed to and included in the dispatchable power supply. Alternatively, it is detachable from the dispatchable power supply and the electric vehicle. Preferably, the charge cable/cable assembly includes a flexible cable, a vehicle connector and/or plug that are required for proper connection. Preferably, the charge cable is a cable assembly as defined in IEC 62196-1 (International Electrotechnical Commission; www.iec.ch). Preferably, the charge cable comprises at least a first plug/connector, more preferably a vehicle connector.

Preferably, the dispatchable power supply (particularly, where it is an electric vehicle charge station) is compliant with IEC 61851-1, more preferably with IEC 61851-1:2017.

Preferably the charge cable/cable assembly is compliant with standard IEC 62196. More preferably, it is compliant with IEC 62196-1, IEC-62196-2, and/or IEC 62196-3.

Suitable IEC 62196 connector types include Type 1, Type 2, CCS1, CCS2, CHAdeMO, Combo1, Combo2, SAE J1772, SAE J3068

Unless the context dictates otherwise, the various optional features of each aspect are equally applicable to the other aspects.

EMBODIMENTS

Unless the context dictates otherwise, the words "comprise", "comprises", "comprising" and the like are to be interpreted in an inclusive, rather than exhaustive sense i.e. the sense of "including, but not limited to". The terms do include embodiments in which no further components are present.

Particular and preferred aspects of the invention are set out in the accompanying independent claims. Features from the dependent claims may be combined with features of the independent claims as desired and appropriate and not merely as explicitly set out in the claims.

An enabling disclosure of the present invention, to one of ordinary skill in the art, is provided herein. Reference now will be made in detail to embodiments of the invention, one or more examples of which are set forth below. Each example is provided by way of explanation of the invention, not limitation of the invention. Of the figures.

Embodiment 1

Figure 1:
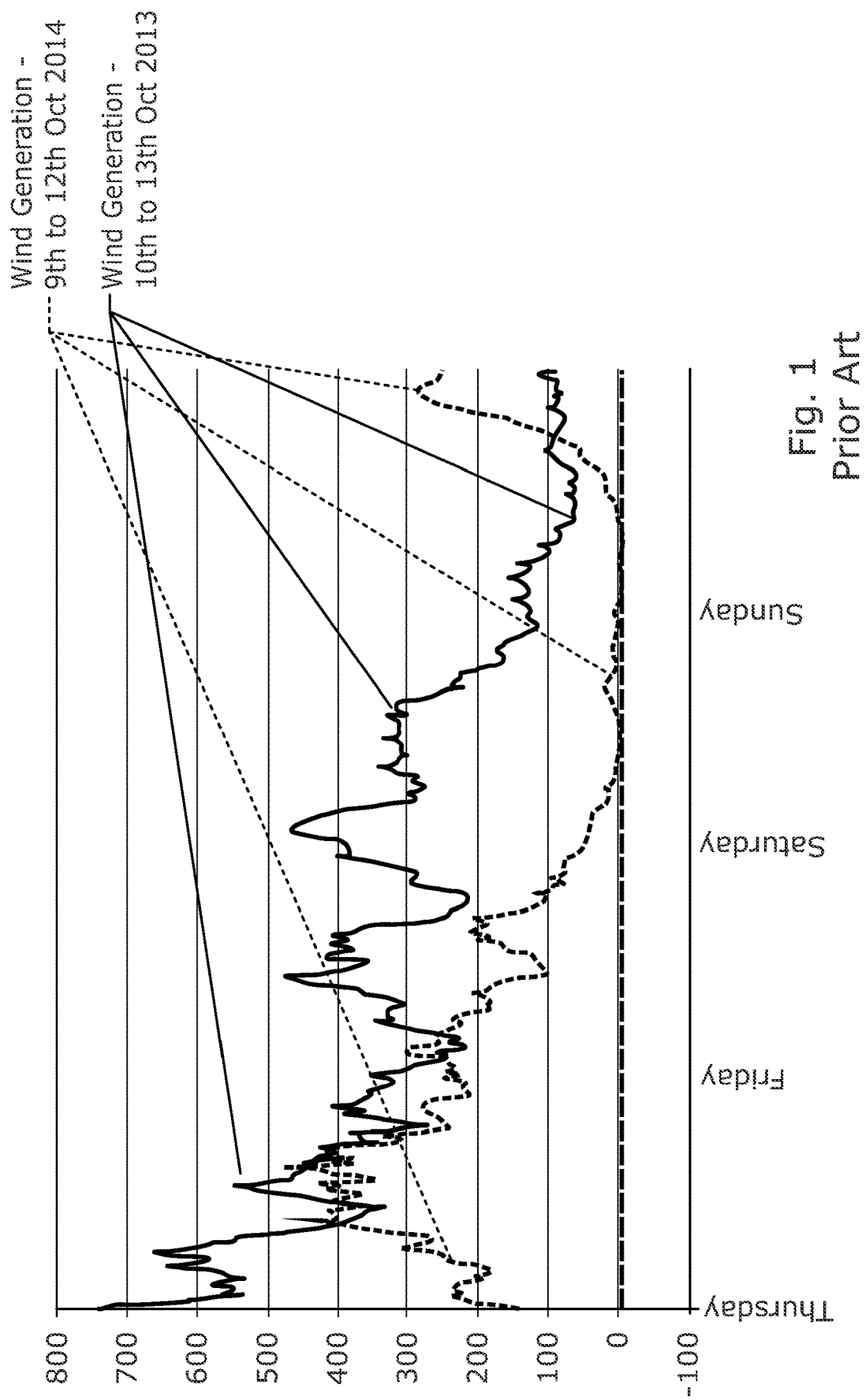
FIG. 1 is a graphical representation of the power generated by a wind farm illustrating the day-to-day variation over a period of 4 days in two years.
Figure 2:
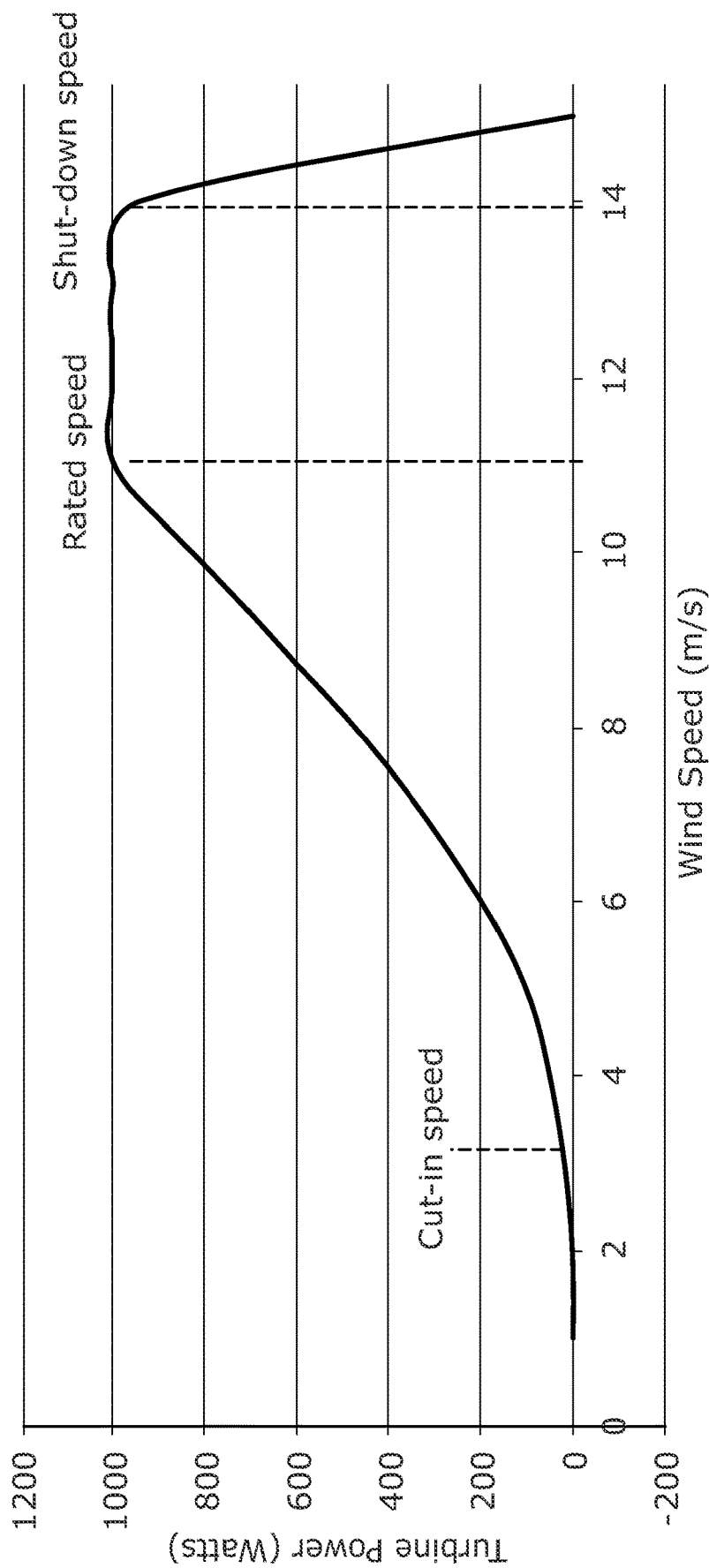
FIG. 2 is a graphical representation of the power generated by a wind turbine against wind speed.
Figure 3:
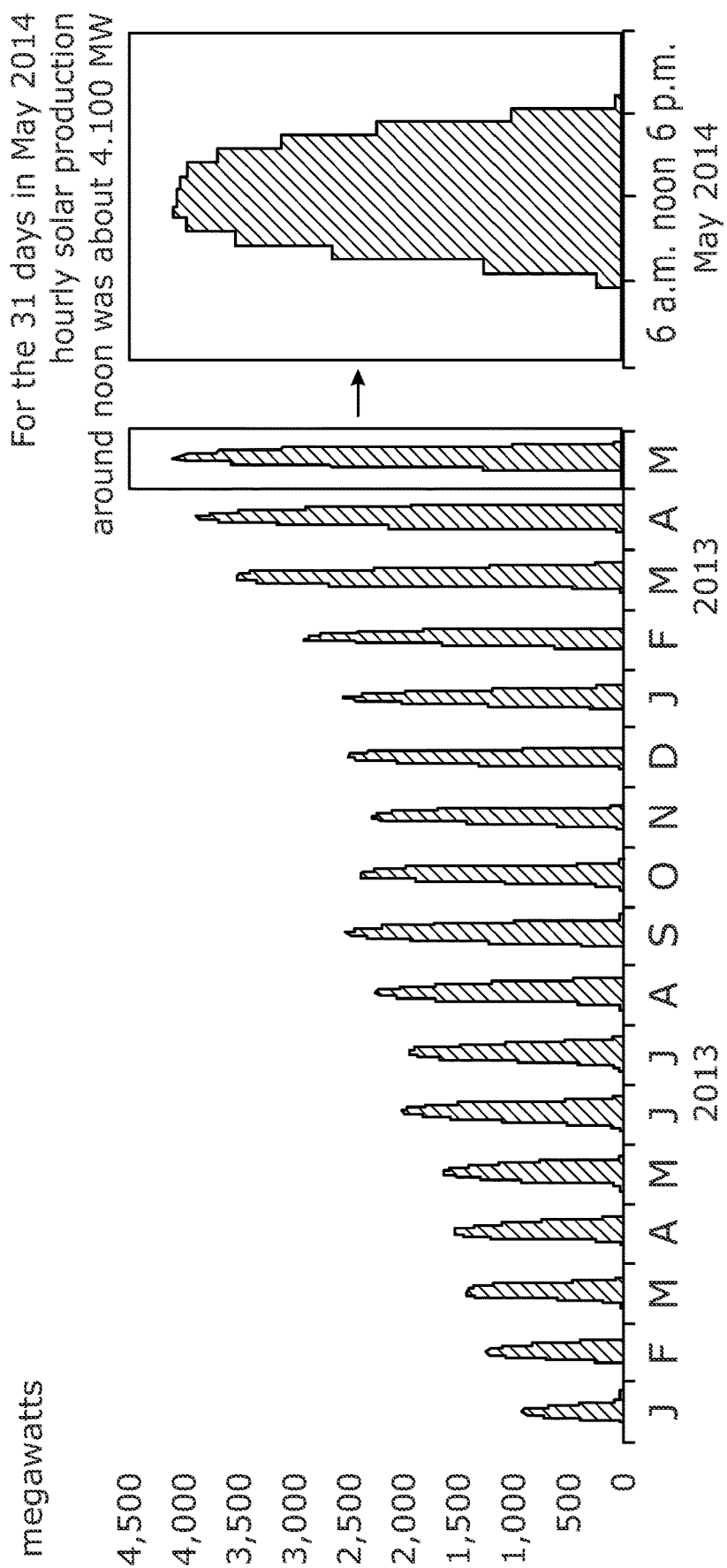
FIG. 3 is a graphical representation of the solar radiation in California given monthly over 2013/2014 (www.eia.gov/todayinenergy/detail.php?id=16851; perma.cc/K7HC-HPW8)
Figure 4:
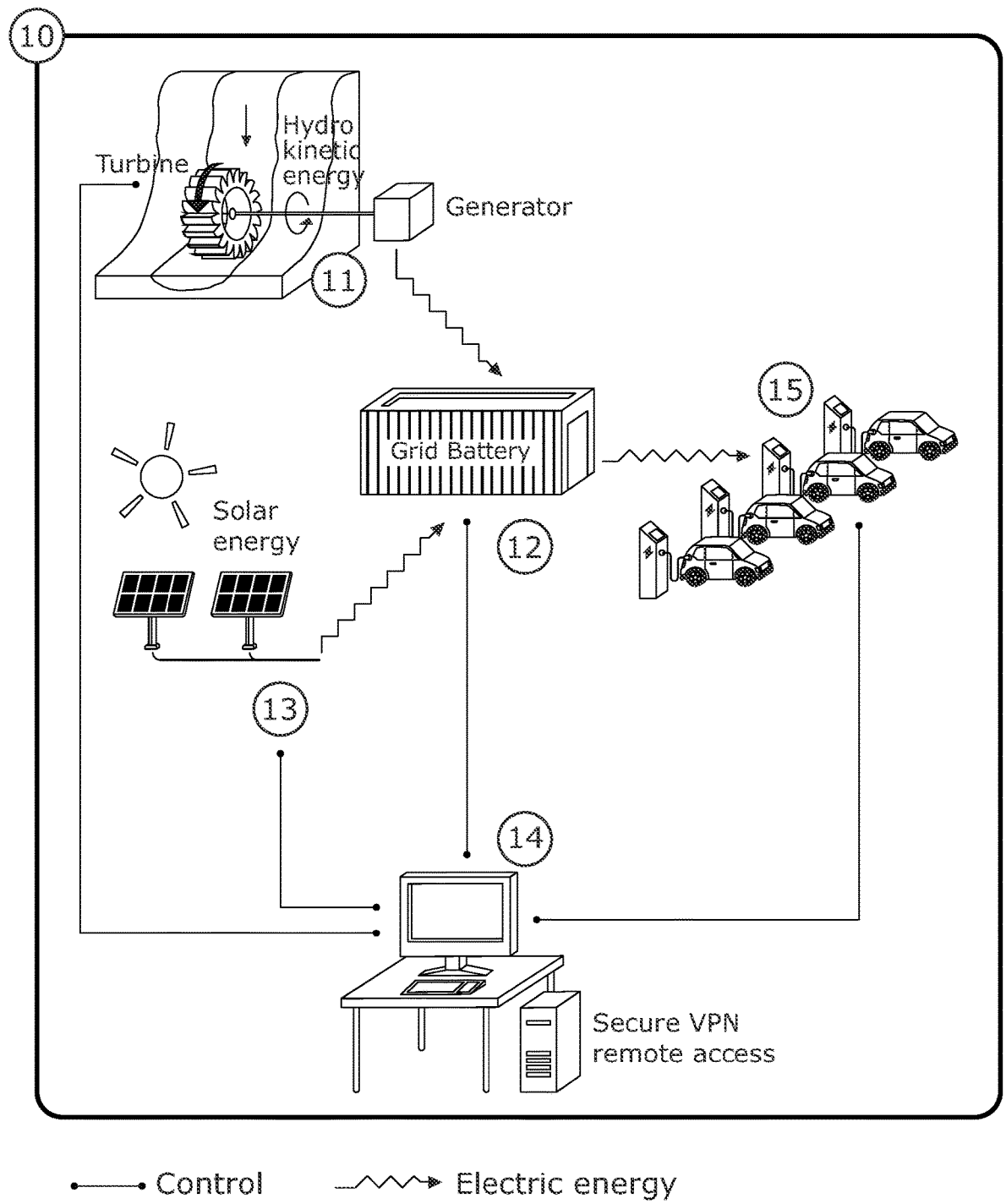
FIG. 4 is a schematic diagram of an off-grid charging system according to at least one exemplary embodiment of the present invention.
Figure 5:
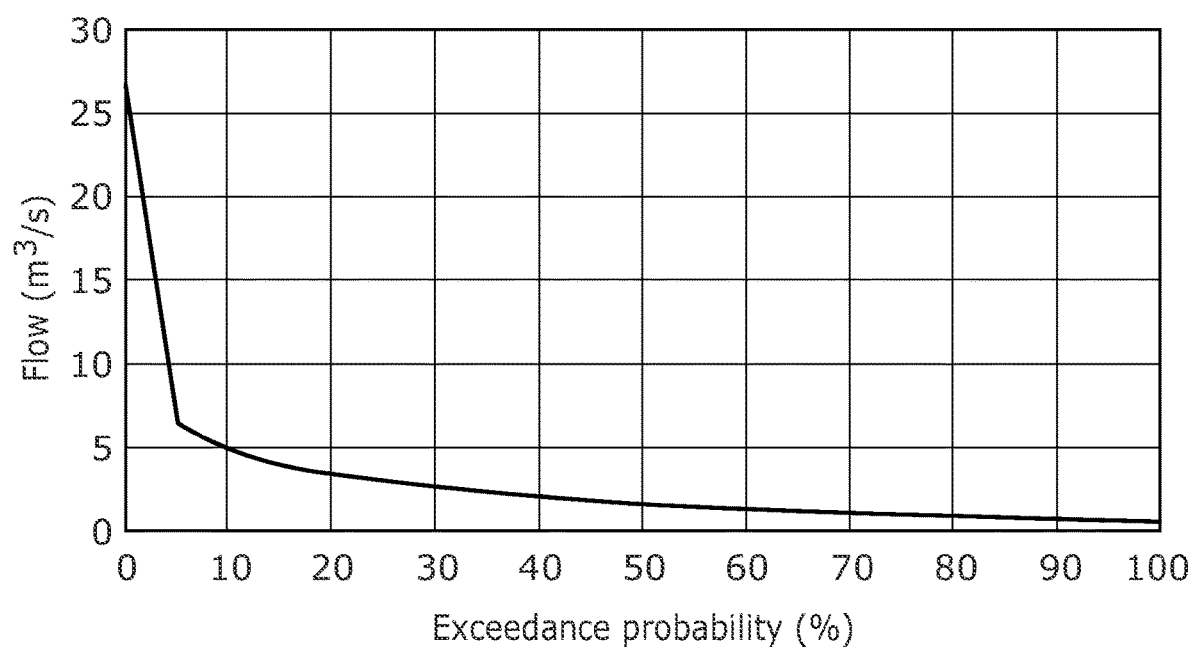
FIG. 5 is a graph showing the exceedance flow curve for a hydrological site in Scotland.

In a first embodiment, and with reference to FIG. 4 of the drawings, there is provided an off-grid electric vehicle (EV) charge station (10) capable of providing 100 kW dispatchable power output ($P_D$). The off-grid electric vehicle charge station (10) comprises a base power generator (11) (also referred to as a primary power generator) in the form of a hydroelectric power generator. The hydroelectric power generator is in fluid flow communication with a water source, and comprises a turbine and generator.

The off-grid electric vehicle charge station (10) further comprises storage capacity in the form of a battery (12) ("grid battery") electrically coupled to the base power generator (11). A secondary power generator (13) in the form of a solar power generator (comprising photovoltaic cells) is also coupled to the battery (12), and both power generators (11, 13) are configurable to generate power from their respective renewable energy sources and send the power to the battery (12).

Connections between components of the invention are illustrated schematically as lines going between each part. However, it will be apparent to the person skilled in the art that such connections could be any suitable connection such as wires, cables, RF communication, etc., which is configured to transmit power on demand.

A control module (14) is coupled to the power generators (11, 13) the battery (12) and the four charge points (15). The control module (14) is a computer located at the site. The control module (14) is configured to communicate with each relevant component using a separate control network and send power upon receipt of a charge signal from the electric vehicle charge points (15), and transmit the energy to the charge points (15) with load. The control module (14) is also configured to ensure that each EV charge point (15) has the required power output of at least 7 kW at any given time. Control module (14) is provided with secure VPN remote access.

For example
Location: Scotland, National Park Area
User Profile: park, walk and slow-charge

| Inputs | Nomenclature | Input |
|---|---|---|
| EV charge station dispatchable power | $P_D$ | 100 kW |
| base power generator (hydro) oversize | $P_{B\text{-}Oversize}$ | 0 kW |
| average annual capacity factor (base) | $CF_B$ | 80% |
| lowest base generation | $P_{B\text{-}Low}$ | 0 kW |
| secondary power generator solar component | $S_S$ | 100% |
| capacity factor solar | $CF_S$ | 12% |
| capacity factor wind | $CF_W$ | n/a |
| peak capacity factor solar | $CF_{S\text{-}Peak}$ | 50% |
| peak capacity factor wind | $CF_{W\text{-}Peak}$ | n/a |
| operational hours (per day) | T | 24 hours |

| Specifications | Nomenclature | Design Size |
|---|---|---|
| base power generator - hydro (11) | $P_{B\text{-}Installed}$ | 100 kW |
| grid-battery (12) power rating | $PR_{Installed}$ | 417 kW |
| grid-battery (12) Capacity | $ES_{Installed}$ | 1.3 MWh |
| secondary power generator - solar (13) | $P_{S\text{-}Installed}$ (i.e. $P_{Secondary\text{-}Installed}$) | 833 kW |

As illustrated in FIG. 4, in this embodiment four 25 kW charge points are provided. The 100 kW dispatchable power can be distributed with other configurations of charge points, as illustrated below:

| charge point(s) (15) Example Usage Scenarios | Power | Charge per vehicle per hour | Simultaneous Charges | EV Charges per hour |
|---|---|---|---|---|
| slow charging (>1 hour) | 7 kW | 7 kWh | 14 | 14 |
| medium charging (>1 hour) | 25 kW | 25 kWh | 4 | 4 |
| fast charging (30 minutes) | 50 kW | 25 kWh | 2 | 4 |
| Super-Fast charging (15 minutes) | 100 kW | 25 kWh | 1 | 4 |

Embodiment 2

A second exemplary embodiment of the invention comprises the base power generator (11), the battery (12), the control module (14) and the EV charge point (15) as described above.

Where a reliable energy source is known, it is not necessary to provide a secondary power generator. For example, dams may often have a minimum water flow or spill from the reservoir in order to allow water to flow downstream, reducing the environmental impact of the dam. Therefore, there is a guaranteed water flow at all times of the year. Therefore, the base power generator (11) can be built to specification for the exact amount of water flow, and the battery (12) sized appropriately so as to provide the "off-grid", always on, EV charging station of the present invention.

In use, the electric vehicle charge station (10) provides an off-grid, always on power source for EV vehicles and is powered entirely by renewable energy sources. The battery (12) and base power generator (11) combine to provide dispatchable power so that the EV charge point (15) is always available to the user. Where necessary, and depending on the site, a secondary power generator (13) may be used to supplement the missing capacity factor if the base power generator (11) is not operating at the preferred capacity factor. The base power generator (11) is capable of limiting the water intake (as it is preferably a hydroelectric power generation system) so as not to generate excess energy. This allows the storage capacity, or battery (12), to be small and therefore significantly reduces the cost and environmental impact of building the electric vehicle charge station (10). The electric vehicle charge station (10) is entirely "off-grid" therefore may be located in areas which are not yet connected to the local power grid.

Embodiment 3

A third exemplary embodiment comprises commercial premises having a typical power demand during operation hours (8 am-6 pm) of 75 kW, and a maximum power demand of 95 kW. A dispatchable off-grid power supply is provided as per Embodiment 1, capable of providing 100 kW of dispatchable power.

Embodiment 4

Figure 6:
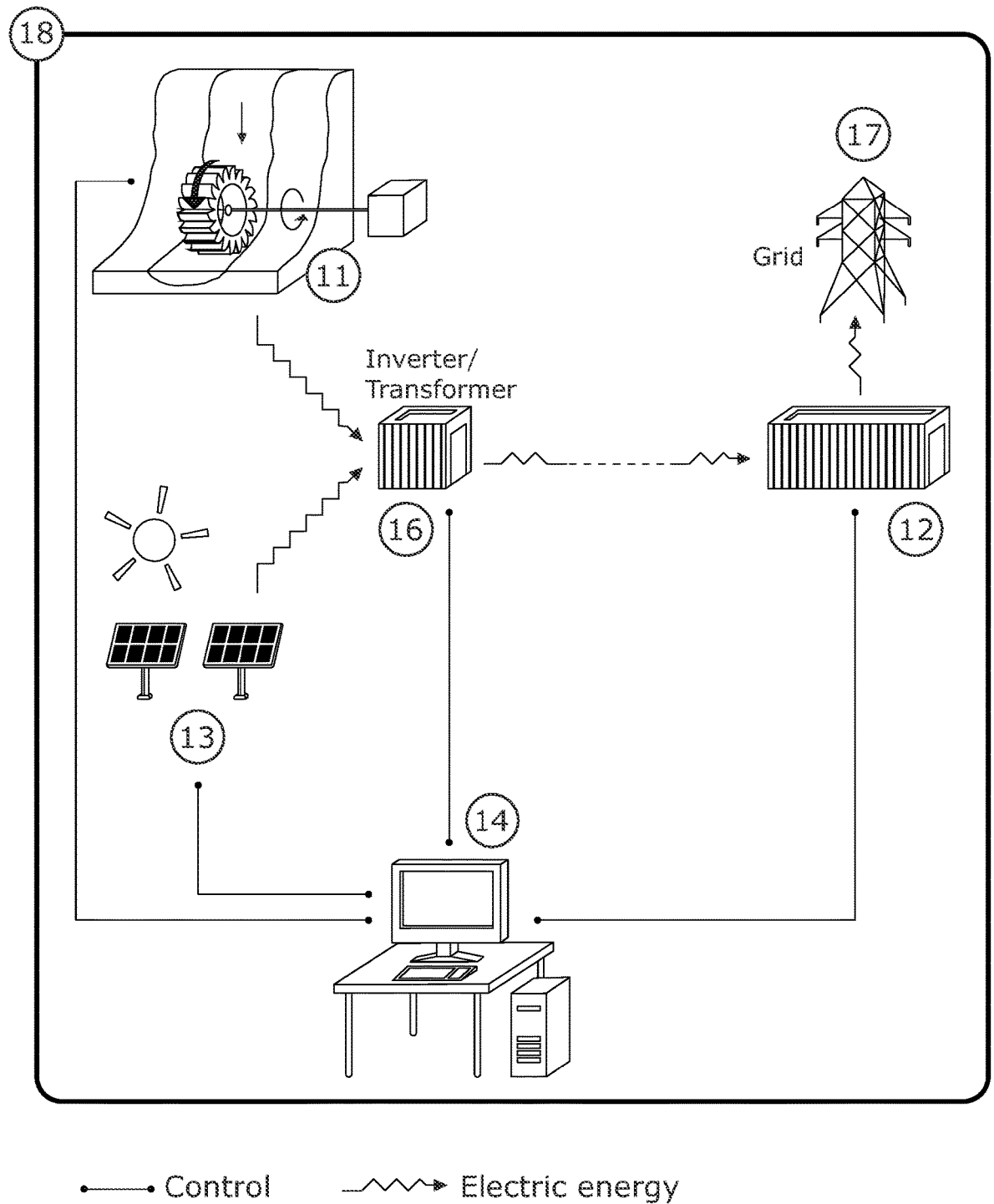
FIG. 6 is a schematic diagram of a dispatchable grid-connected power supply as per Embodiments 4-7.

A fourth example embodiment in the form of an on-grid dispatchable power supply (18) is illustrated in FIG. 6 and comprises the base power generator (11), the battery (12), and the control module (14) as described above. A dispatchable power supply is provided as per Embodiment 1, capable of providing dispatchable power. Rather than having an EV charge point (15), a consumer is provided in the form of a grid connection (17). Generated power from the base power generator (11) is transmitted to inverter and transformer (16) and then to battery 12 which is located adjacent grid connection (17). Additional non-dispatchable generation can be sold onto the grid (for example at times of system peaking).

Embodiment 5

In an 8-hour 3 MW storage discharge configuration, a dispatchable power supply is provided as per Embodiment 4. 1 MW dispatchable generation is provided by the base power generator (11) and the secondary power generator (13). Battery (12) has a capacity of 16 MWh This provides 8 hours of dispatchable power at 3 MW, compliant with requirements for the capacity market. As for Embodiment 4, generated power from the base power generator (11) is transmitted to inverter and transformer (16) and then to battery 12 which is located adjacent grid connection (17).

Embodiment 6

In a 16-hour 1.5 MW storage discharge configuration (for example, "black start"), a dispatchable power supply is provided as per Embodiment 4. 1 MW dispatchable generation is provided by the base power generator (11) and the secondary power generator (13). Battery (12) has a capacity of 8 MWh. This provides 16 hours of dispatchable power at 1.5 MW, compliant with requirements for a "black start" service in the PJM market. As for Embodiment 4, generated power from the base power generator (11) is transmitted to inverter and transformer (16) and then to battery 12 which is located adjacent grid connection (17).

Embodiment 7

In a 12-minute 120 MW storage discharge configuration, a dispatchable power supply is provided as per Embodiment 4. 1 MW dispatchable generation is provided by the base power generator (11) and the secondary power generator (13). Battery (12) has a capacity of 24 MWh. This provides 12 minutes of dispatchable power at 120 MW, available every 24 hours. This is sufficient to substitute for always on gas-plant spinning reserve. Instead of running the gas plants always on during peak times, this invention will carry a 120 MW load while the gas plant is warmed up. As for Embodiment 4, generated power from the base power generator (11) is transmitted to inverter and transformer (16) and then to battery 12 which is located adjacent grid connection (17).

Embodiment 8

A dispatchable power supply is provided as per Embodiment 4. Grid connection (17) is replaced with a local consumer and a local grid, e.g. an industrial facility. Thus, a UPS (uninterruptable power supply) service can be provided for a local consumer, bridging short gaps in grid supplied power where necessary, and providing power in critical situations so as to allow for a graceful shutdown of services.

Reference signs are incorporated in the claims solely to ease their understanding, and do not limit the scope of the claims. The present invention is not limited to the above embodiments only, and other embodiments will be readily apparent to one of ordinary skill in the art without departing from the scope of the appended claims.

REFERENCE SIGNS

10—Electric vehicle charge station
11—Base power generator
12—Battery
13—Secondary power generator
14—Control module
15—EV charge point(s)
16—Inverter and transformer
17—Grid connection
18—On-grid dispatchable power supply

The invention claimed is:

1. A dispatchable renewable power supply having a total dispatchable power output ($P_D$) of at least 25 kW, the dispatchable power supply comprising:
   (i) a base power generator selected from at least one of the group consisting of: a hydroelectric power generator, and a geothermal power generator;
   (ii) a secondary power generator comprising at least one renewable power generator;
   (iii) a battery; and
   (iv) power transmission means for communicating the generated power to an at least one consumer,
wherein each of the power generators is non-dispatchable, and
   (a) the dispatchable power supply has a peak instantaneous non-base required power output ($P_{M\text{-}Peak}$),
   (b) the secondary power generator has a capacity factor ($CF_{secondary}$), and
   (c) the total installed power generating capacity of the secondary power generator ($P_{Secondary\text{-}Installed}$) is equal to $P_{M\text{-}Peak} \times (1/CF_{Secondary})$.

2. A The dispatchable renewable power supply according to claim 1, wherein the base power generator has a maximum power output ($P_{B\text{-}Installed}$) equal to or greater than the total dispatchable power output ($P_D$).

3. The dispatchable renewable power supply according to claim 2, wherein the base power generator has a maximum power output ($P_{B\text{-}Installed}$) equal to the total dispatchable power output ($P_D$).

4. The dispatchable renewable power supply according to claim 1, wherein the base power generator has an annualised capacity factor ($CF_B$) of at least 50%.

5. The dispatchable renewable power supply according to claim 1, wherein the battery has a total installed power rating ($PR_{Installed}$) of the greater of $PR_B$ and $PR_{Secondary}$, wherein:
   $PR_B$ is the power rating requirement from the base power generator and which is equal to or greater than the base power generator maximum power output ($P_{B\text{-}Installed}$); and
   $PR_{Secondary}$ is the power rating requirement from the secondary power generator and which is equal to or greater than $P_{secondary\text{-}Installed} \times CF_{Secondary\text{-}Peak}$, wherein $CF_{Secondary\text{-}Peak}$ is the instantaneous peak capacity factor of the secondary power generator.

6. The dispatchable renewable power supply according to claim 5, wherein the secondary power generator is not a hydroelectric power generator or a geothermal power generator, wherein the battery has a storage capacity ($ES_{Generators}$) equal to or greater than $ES_B+ES_{Secondary}$, wherein $ES_B$ is the minimum required energy storage for the base power generator, and $ES_{secondary}$ is the minimum required energy storage capacity for the secondary power generator.

7. The dispatchable renewable power supply according to claim 1, wherein the secondary power generator is not a hydroelectric power generator or a geothermal power generator.

8. The dispatchable renewable power supply according to claim 1, wherein the secondary power generator is selected from at least one of the group consisting of: a solar power generator, and a wind power generator.

9. The dispatchable renewable power supply according to claim 8, wherein the secondary power generator comprises a solar power generator and a wind power generator.

10. The dispatchable renewable power supply according to claim 1, wherein it has a total dispatchable power output ($P_T$) of at least 50, 75, 100, 200, 250, 300, 400, 500, 750 or 1000 kW.

11. The dispatchable renewable power supply according to claim 1, wherein the base power generator is a hydroelectric power generator.

12. The dispatchable renewable power supply according to claim 11, wherein the hydroelectric power generator is in fluid flow communication with a water source.

13. The dispatchable renewable power supply according to claim 1, wherein it is an off-grid power supply.

14. The dispatchable renewable power supply according to claim 13, wherein it is an off-grid electric vehicle charge station.

15. A dispatchable renewable power supply according to claim 14, wherein the power transmission means comprises an at least one electric vehicle charge point.

16. The dispatchable renewable power supply according to claim 15, wherein the at least one electric vehicle charge point has a power output of at least 7 kW.

17. A dispatchable renewable power supply having a total dispatchable power output ($P_T$) of at least 25 kW, the dispatchable power supply comprising:
(i) a base power generator selected from at least one of the group consisting of: a hydroelectric power generator, and a geothermal power generator;
(ii) a battery; and
(iii) power transmission means for communicating the generated power to an at least one consumer,
wherein each of the power generators is non-dispatchable, and
(a) the dispatchable power supply has a peak instantaneous non-base required power output ($P_{M-Peak}$),
(b) the secondary power generator has a capacity factor ($CF_{Secondary}$), and
(c) the total installed power generating capacity of the secondary power generator ($P_{Secondary-Installed}$) is equal to $P_{M-Peak} \times (1/CF_{Secondary})$.

18. The dispatchable renewable power supply according to claim 17, wherein the base power generator is a hydroelectric power generator.

* * * * *